(12) United States Patent
Schnell et al.

(10) Patent No.: US 8,587,431 B2
(45) Date of Patent: Nov. 19, 2013

(54) METHOD AND APPARATUS FOR TUNNELING INFORMATION IN RFID COMMUNICATIONS

(75) Inventors: Richard L. Schnell, San Jose, CA (US); David B. Koons, San Jose, CA (US)

(73) Assignee: Savi Technology, Inc., Alexandria, VA (US)

( * ) Notice: Subject to any disclaimer, the term of this patent is extended or adjusted under 35 U.S.C. 154(b) by 382 days.

(21) Appl. No.: 12/789,804

(22) Filed: May 28, 2010

(65) Prior Publication Data

US 2010/0302037 A1 Dec. 2, 2010

Related U.S. Application Data

(60) Provisional application No. 61/182,444, filed on May 29, 2009.

(51) Int. Cl.
*G08B 13/14* (2006.01)

(52) U.S. Cl.
USPC .......... 340/572.1; 340/572.2; 340/572.4; 340/572.7; 340/572.8; 340/539.13; 340/539.26; 340/10.1; 340/10.2; 340/10.4; 235/375; 235/382; 235/385; 235/492

(58) Field of Classification Search
USPC ............ 340/572.1–572.8, 539.13, 539.26, 340/545.6, 10.1–10.4; 235/375, 382, 385, 235/492
See application file for complete search history.

(56) References Cited

U.S. PATENT DOCUMENTS

| 7,394,381 | B2* | 7/2008 | Hanson et al. ............. 340/572.4 |
| 7,434,731 | B2 | 10/2008 | Cargonja et al. |
| 2006/0109106 | A1* | 5/2006 | Braun ...................... 340/539.13 |
| 2007/0159338 | A1 | 7/2007 | Beber |
| 2007/0262144 | A1 | 11/2007 | Cargonja et al. |
| 2009/0002174 | A1 | 1/2009 | Kukita et al. |

OTHER PUBLICATIONS

ISR and Written Opinion for related PCT Application No. PCT/US2010/036605, dated Jan. 31, 2011.

* cited by examiner

*Primary Examiner* — Tai T Nguyen
(74) *Attorney, Agent, or Firm* — IP Law Leaders PLLC; Cameron H. Tousi

(57) ABSTRACT

A method and apparatus involve a radio frequency identification tag that receives a wireless signal containing a message type conforming to an extension of a standard communication protocol and having an extended services segment, the tag then transmitting the extended services segment through an extended services interface. According to a different aspect, a method and apparatus involve a radio frequency identification tag that stores data which includes respective information regarding each of multiple extended services, and that responds to receipt of a wireless signal which is an extension to a standard protocol by transmitting a further wireless signal which is an extension to the protocol and contains at least part of the data. According to yet another aspect, a method and apparatus involve a radio frequency identification tag that responds to receipt of one wireless signal by transmitting a further wireless signal containing information regarding multiple sensors.

13 Claims, 10 Drawing Sheets

Fig. 4

| PREAMBLE | PROTOCOL IDENTIFICATION | PACKET OPTIONS | PACKET LENGTH | TAG MANUFACTURER IDENTIFICATION | SESSION IDENTIFICATION | TAG SERIAL NUMBER | COMMAND OPCODE | COMMAND PARAMETERS | CRC | POSTAMBLE |
|---|---|---|---|---|---|---|---|---|---|---|
| 131 | 132 | 133 | 134 | 135 | 136 | 137 | 138 | 139 | 140 | 141 |

COMMAND 143 spans COMMAND OPCODE and COMMAND PARAMETERS.

| PREAMBLE | PROTOCOL IDENTIFICATION | TAG STATUS | PACKET LENGTH | SESSION IDENTIFICATION | TAG MANUFACTURER IDENTIFICATION | TAG SERIAL NUMBER | COMMAND OPCODE | RESPONSE PARAMETERS | CRC | POSTAMBLE |
|---|---|---|---|---|---|---|---|---|---|---|
| 151 | 152 | 153 | 154 | 155 | 156 | 157 | 158 | 159 | 160 | 161 |

RESPONSE 163 spans COMMAND OPCODE and RESPONSE PARAMETERS.

148

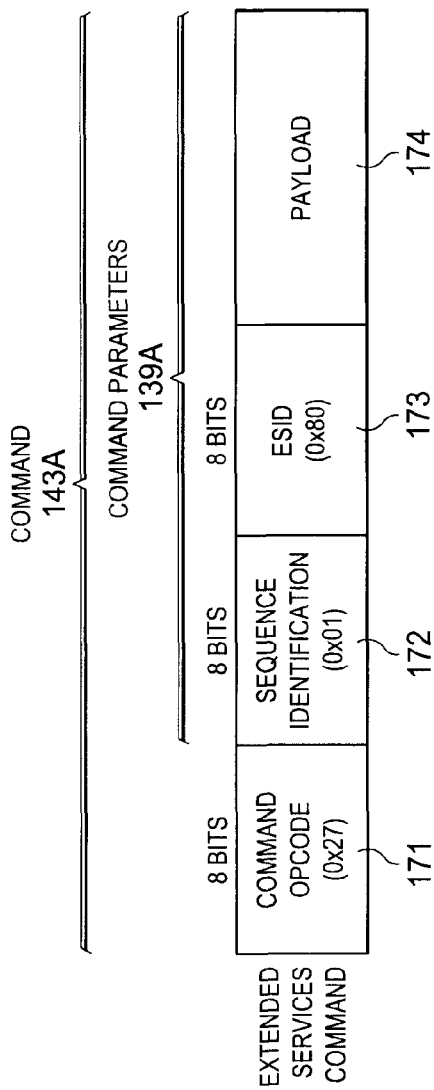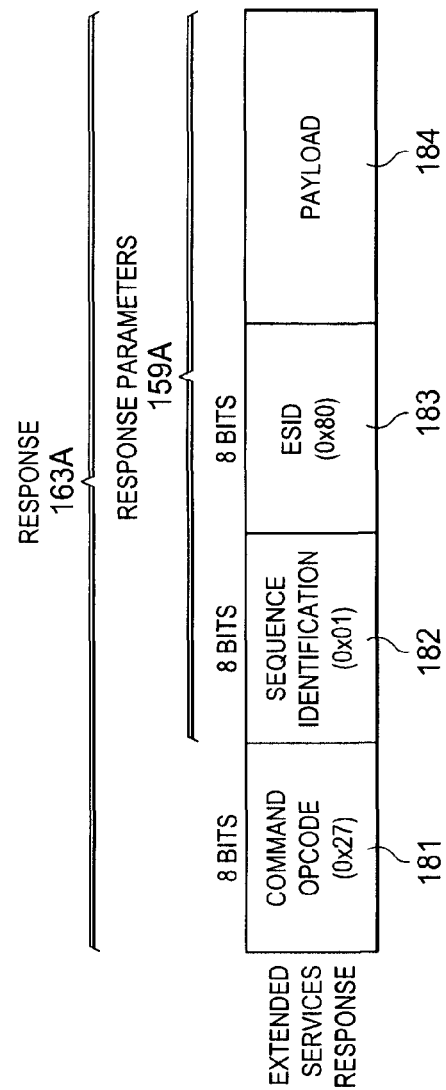

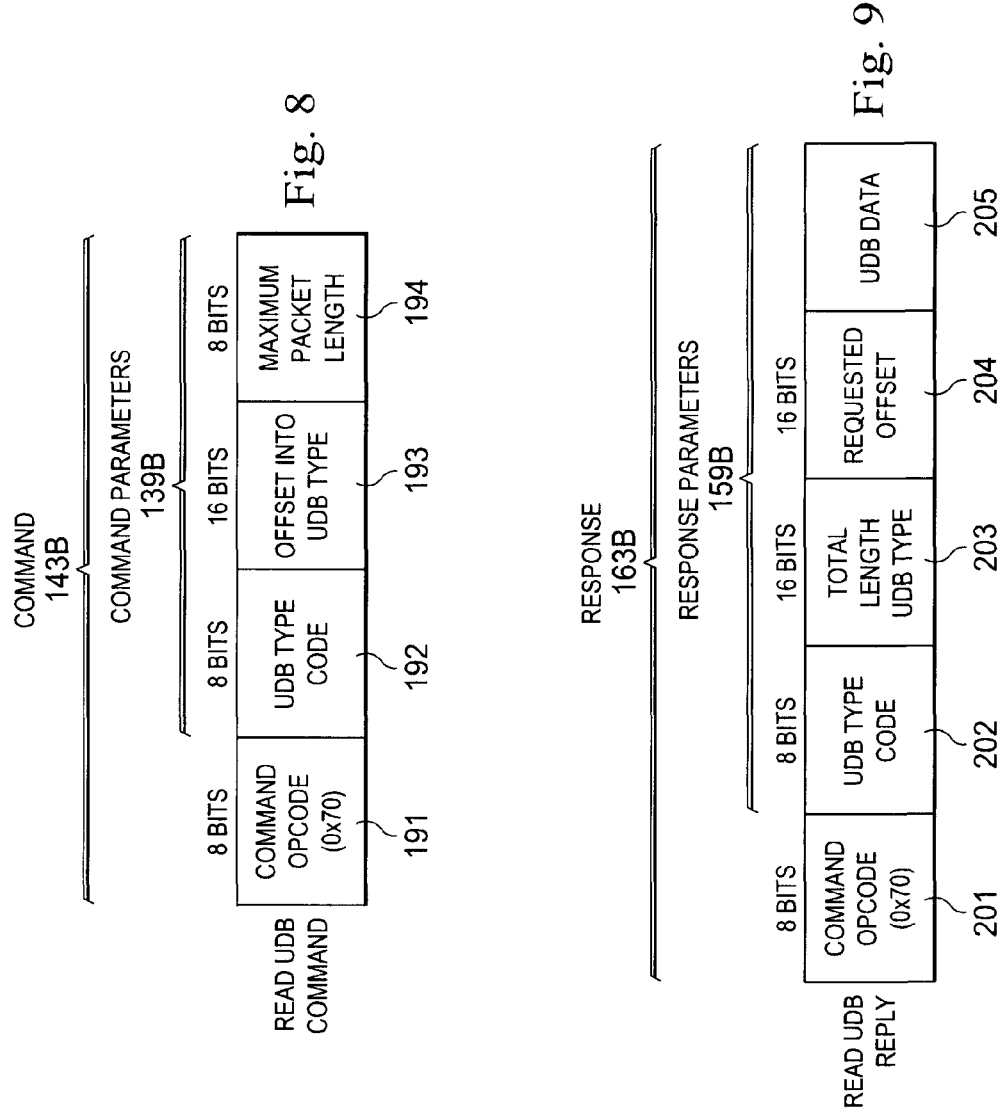

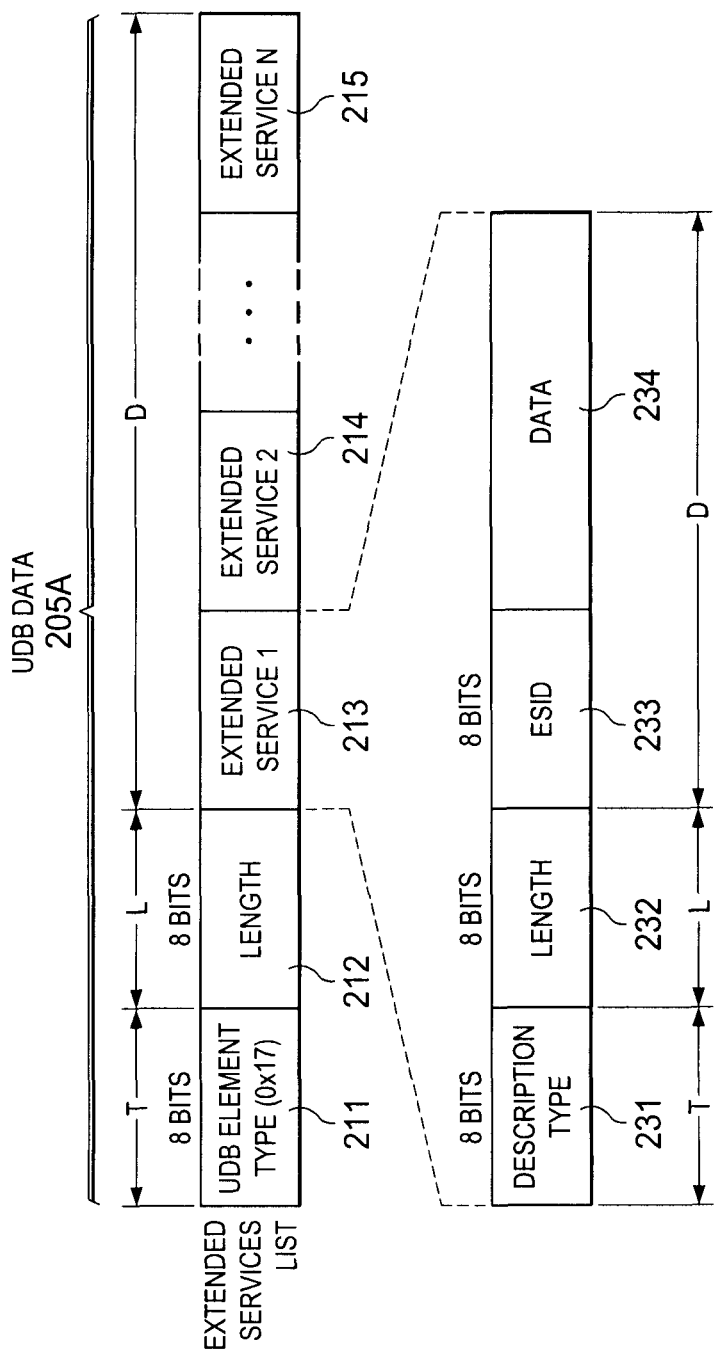

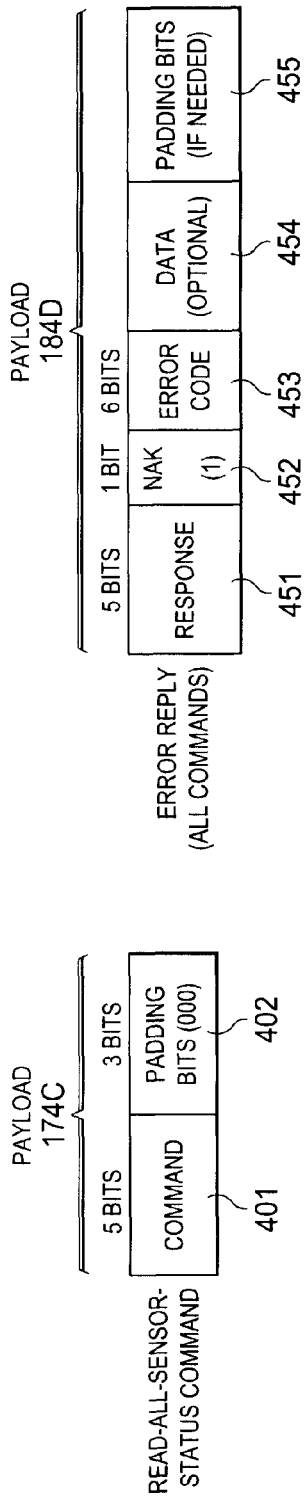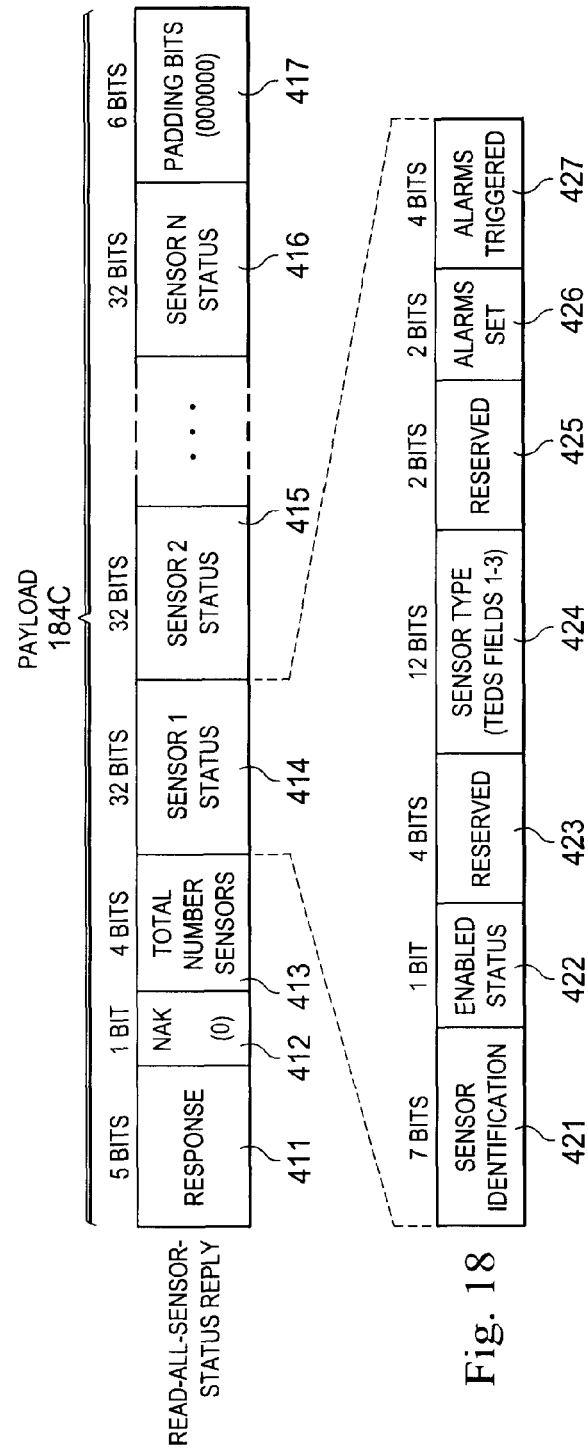

METHOD AND APPARATUS FOR TUNNELING INFORMATION IN RFID COMMUNICATIONS

This application claims the priority under 35 U.S.C. §119 of provisional application No. 61/182,444 filed May 29, 2009, the entire disclosure of which is hereby incorporated herein by reference.

FIELD OF THE INVENTION

This invention relates in general to radio frequency identification (RFID) systems and, more particularly, to techniques that enhance the functionality of RFID tags, including enhancement of sensor functionality in tags.

BACKGROUND

Radio frequency identification (RFID) systems are used for a variety of different applications. As one example, RFID systems are commonly used to track and monitor shipping containers or other mobile assets. RFID tags are attached to the shipping containers or other assets, and exchange wireless communications with other system components, including stationary interrogators and/or readers.

Over time, RFID tags are being provided with a progressively increasing degree of extended functionality, above and beyond that needed for basic RFID operation. These optional extended functions are sometimes referred to as "extended services". As one aspect of this, extended services may be implemented by adding supplemental hardware and/or software components to a tag. For example, a tag may include one or more sensors, along with a software module that handles the sensors. As another example, a tag may include a global positioning system (GPS) receiver, along with a software module that processes data from the GPS receiver. As yet another example, a tag may include a software module that provides enhanced security for wireless communications, by encrypting and decrypting information being sent and received by the tag.

Many RFID tags and interrogators are currently being manufactured to communicate according to a protocol that is an international standard commonly known as ISO 18000-7. Although this protocol has been generally adequate for its intended purposes, it has not been entirely satisfactory in all respects. As one example, this protocol does not allow an interrogator to efficiently obtain from a given tag an identification of all the extended services that are implemented on the tag.

A further consideration is that there are industry-standard protocols that can be used to interact with a single sensor. One example is ISO 21451.7, which is based on another industry-standard protocol commonly know as IEEE 1451.7. Although the ISO 21451.7 protocol has been generally adequate for its intended purposes, it has not been entirely satisfactory in all respects. As one aspect of this, there is currently no convenient way to use this protocol in conjunction with the ISO 18000-7 protocol, so that an interrogator can directly and efficiently communicate with a sensor that is provided in a tag. As another aspect, the ISO 21451.7 protocol is specifically designed for interaction with only a single sensor. Thus, in addition to the fact that there is currently no way to use the ISO 21451.7 protocol in conjunction with the ISO 18000-7 protocol, where a tag has multiple sensors it would be necessary for the tag to be simultaneously running several separate, identical instantiations of a single-sensor software module for ISO 21451.7 (one module for each sensor). This would obviously be very cumbersome and inefficient.

BRIEF DESCRIPTION OF THE DRAWINGS

A better understanding of aspects of the present invention will be realized from the detailed description that follows, taken in conjunction with the accompanying drawings, in which:

FIG. 4 is a diagrammatic view of a digital word contained in wireless signals transmitted from the interrogator to the tag of FIG. 1.

FIG. 5 is a diagrammatic view of a digital word contained in wireless signals transmitted from the tag to the interrogator of FIG. 1.

FIG. 6 is a diagrammatic view of one example of a command that can appear in the digital word of FIG. 4.

FIG. 7 is a diagrammatic view of one example of a response that is a reply to the command of FIG. 6, and that can appear in the digital word of FIG. 5.

FIG. 8 is a diagrammatic view of another example of a command that can appear in the digital word of FIG. 4.

FIG. 9 is a diagrammatic view of another example of a response that is a reply to the command of FIG. 8, and that can appear in the digital word of FIG. 5.

FIG. 10 is a diagrammatic view of one example of UDB data that can appear in the response of FIG. 9.

FIG. 17 is a diagrammatic view of yet another example of a payload that contains a command, and that could appear in the command of FIG. 6.

FIG. 18 is a diagrammatic view of an example of a payload that contains a reply to the command of FIG. 17, and that could appear in the response of FIG. 7.

FIG. 19 is a diagrammatic view of an example of a payload that contains an alternative reply to any of the commands of FIG. 13, 15 or 17, and that could appear in the response of FIG. 7.

DETAILED DESCRIPTION

Figure 1:
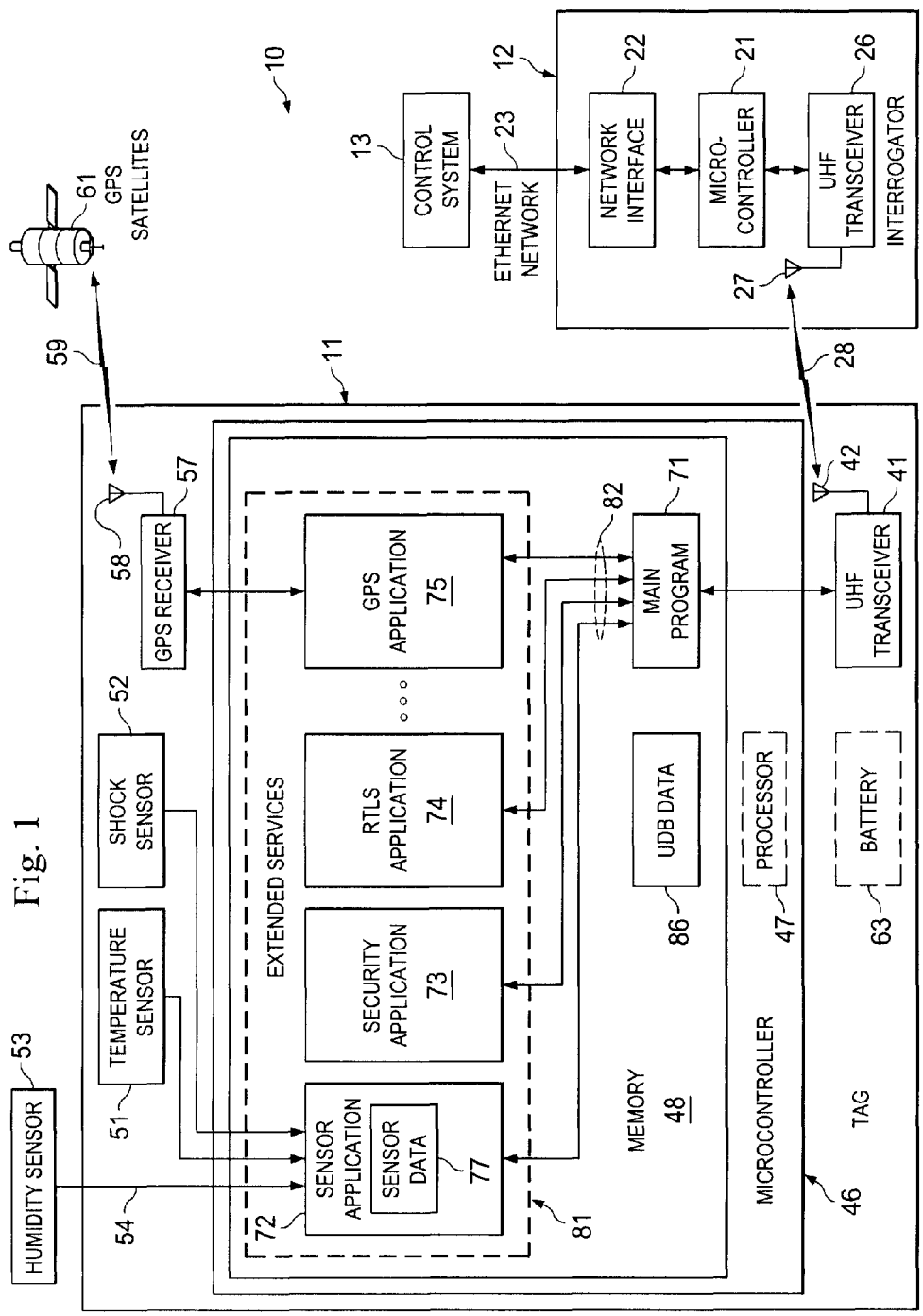
FIG. 1 is a block diagram of an apparatus that is a radio frequency identification (RFID) system, that includes an interrogator and a tag, and that embodies aspects of the present invention.

FIG. 1 is a block diagram of an apparatus that is a radio frequency identification (RFID) system 10, and that embodies aspects of the present invention. The system 10 includes an RFID tag 11, an interrogator 12, and a control system 13. The interrogator 12 is a device that is also sometimes referred to as a reader. The system 10 actually includes many tags of the type shown at 11, and several interrogators of the type shown at 12. However, for simplicity and clarity in the discussion that follows, only one tag 11 and one interrogator 12 are shown and described. In the disclosed embodiment, the interrogator 12 is stationary, and the tag 11 can move relative to it. For example, the tag 11 may be mounted on a not-illustrated shipping container, on a vehicle (such as a truck or forklift), on an item that is being transported (such as a box containing a television set), or on some other type of mobile asset. Although the interrogator 12 in the disclosed embodiment is stationary, it would alternatively be possible for the interrogator to be mobile. And if the interrogator 12 is mobile, then it would alternatively be possible for the tag 11 to be stationary.

With reference to the interrogator 12, FIG. 1 does not show all of the circuitry present within the interrogator, but instead shows only selected portions of the circuitry that are relevant to an understanding of aspects of the present invention. The interrogator 12 includes a microcontroller 21. Persons skilled in the art are familiar with the fact that a microcontroller is an integrated circuit containing a microprocessor, a read-only memory (ROM), and a random access memory (RAM). The ROM stores a computer program that is executed by the microprocessor, along with static data used by the microprocessor. The RAM stores dynamic data that is changed by the microprocessor during system operation. The interrogator 12 includes a network interface 22 that is coupled to the microcontroller 21, and that is also coupled through a network 23 to the control system 13. In FIG. 1, the network 23 is a type of network commonly referred to in the art as an Ethernet network. However, the network 23 could alternatively be any other suitable type of network or communications system.

The interrogator 12 also includes an ultra high frequency (UHF) transceiver 26, and an antenna 27 through which the transceiver can send and receive wireless signals 28. The wireless signals 28 contain information that is explained in more detail later. In the embodiment of FIG. 1, the wireless signals 28 are generated by frequency shift keying (FSK) to modulate information onto a radio frequency (RF) carrier signal. However, it would alternatively be possible to use some other type of modulation. In the disclosed embodiment, the carrier signal has a frequency of 433.92 MHz, but it could alternatively have any other suitable frequency. One possible alternative frequency is 915 MHz. However, the disclosed embodiment uses 433.92 MHz because it is available for use in a larger number of countries under prevailing governmental regulations regarding the transmission of electromagnetic signals. In the disclosed embodiment, the wireless signals 28 have a transmission range of about 300 feet, but the transmission range could alternatively be larger or smaller.

As to the wireless signals 28 transmitted between the interrogator 12 and tag 11, the interrogator and tag in the disclosed embodiment can communicate using an existing international industry standard known as ISO 18000-7. This international standard was promulgated by the International Organization for Standardization (ISO), which is headquartered in Geneva, Switzerland. Persons skilled in the art are familiar with the ISO 18000-7 standard. As used herein, the term ISO 18000-7 refers to a specific version of the standard, which is ISO/IEC FDIS 18000-7:2009(E). Although the interrogator 12 and tag 11 can communicate in conformity with the ISO 18000-7 standard, they can also communicate in new and unique ways that are not currently part of the 18000-7 standard, but are potential enhancements or extensions that could be added to the 18000-7 standard. These enhancements or extensions are discussed later.

Turning to the tag 11, FIG. 1 does not show everything that is present in the tag 11, but instead shows only selected portions that are relevant to an understanding of aspects of the present invention. The tag 11 includes a UHF transceiver 41, and an antenna 42 through which the transceiver 41 can send and receive wireless signals, including the wireless signals 28. The tag 11 also includes a microcontroller 46 having a processor 47 and a memory 48. In FIG. 1, the memory 48 is a diagrammatic representation of all types of memory that happen to be present within the microcontroller 46, including ROM, RAM, flash memory, and/or any other type of storage. Some of the information stored in the memory 48 is discussed later.

The tag 11 includes a temperature sensor 51 and a shock sensor 52, which are located within a housing of the tag 11. The temperature sensor 51 monitors the ambient temperature within the tag, which corresponds to the ambient external temperature near the tag. The shock sensor 52 can detect the magnitude of a physical shock experienced by the tag or by an asset to which the tag is attached, for example where the tag or asset is struck with force by some other object. A humidity sensor 53 is provided externally of the tag 11. The humidity sensor 53 may be mounted on the exterior of the housing of the tag, or may be mounted on some other structure that is spaced some distance from the tag. The sensors 51-53 are each operatively coupled to the microcontroller 46, either by wires, or by some form of wireless link, such as an infrared (IR) or an RF link. For example, wires 54 couple the humidity sensor 53 to the microcontroller 46 within the tag 11. The temperature sensor 51, shock sensor 52 and humidity sensor 53 shown in FIG. 1 are merely exemplary. The system 10 could have various other types of sensors, and could have a larger or smaller number of sensors. Moreover, any given sensor could be located either inside or outside of the tag 11.

The tag 11 includes a global positioning system (GPS) receiver 57, and an associated antenna 58. Through the antenna 58, the GPS receiver 57 can receive standard wireless GPS signals 59 transmitted by several conventional GPS satellites that orbit the earth, and that are represented diagrammatically at 61 in FIG. 1. The GPS signals from satellites 61 include standard GPS positioning information that can be used in a known manner to calculate the location of the tag 11 on the surface of the earth.

The tag 11 includes a battery 63 that powers all of the circuitry within the tag, as well as the external humidity sensor 53. Alternatively, the humidity sensor 53 could have a separate battery. In the disclosed embodiment, the battery 63 is a long-lasting lithium battery of a known type, but could alternatively be some other type of battery.

Referring again to the microcontroller 46, the memory 48 stores several computer programs that are executed by the processor 47, including a main program 71, a sensor application 72, a security application 73, a real time locating system (RTLS) application 74, and a GPS application 75. The main program 71 provides the basic functionality of the tag, including RFID functionality. The sensor application 72 manages all of the sensors 51-53 that are associated with the tag 11, and maintains some data 77 regarding the sensors. The data 77 is discussed later. The security application 73 provides enhanced security, for example by encrypting and decrypting information being sent and received via the wireless signals 28, and by verifying for the tag 11 the authenticity of the remote interrogator 12 as a device that is authorized to communicate with the tag. The RTLS application 74 supplements the RFID functionality of the tag 11 by providing RTLS capability of a type that is known in the art, and that is therefore not described here in detail. The GPS receiver 57 provides the GPS application 75 with position information extracted from the GPS signals 59, and the GPS application 57 uses this position information to calculate the current location of the tag 11 on the surface of the earth.

The application programs 72-75 each provide a service that supplements or extends the capabilities of the main program 71 of the tag. The application programs 72-75 are therefore collectively referred to herein as extended services 81. The communication between the main program 71 and each of the application programs 72-75 is referred to as an extended services interface 82. The application programs 72-75 shown in FIG. 1 are merely exemplary. The tag 11 could have other types of extended services that are not illustrated and described here. Although FIG. 1 happens to show four types of extended services at 72-75, the tag 11 could have a larger or smaller number of extended services, or could have no extended services at all. In the disclosed embodiment, the tag 11 is configured to handle a maximum of 16 extended services 81. Alternatively, however, the maximum number of extended services could be higher or lower.

Figure 2:
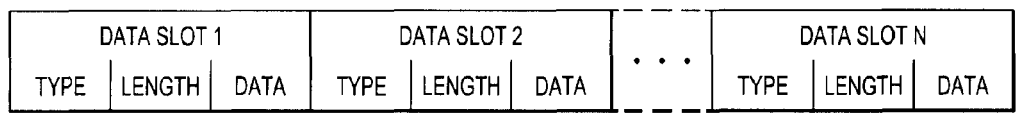
FIG. 2 is a diagrammatic view showing the format of a universal data block (UDB) that is used for transfers of certain types of data.

The memory 48 of the microcontroller 46 has a portion set aside to store universal data block (UDB) data 86. A UDB is an industry-standard format for transmitting data. FIG. 2 is a diagrammatic view showing the standard format of a UDB 88. The UDB 88 has N similar data slots, where N is an integer. Each of the N data slots has the same format, including the same three fields. These three fields are a type field, a length field and a data field. The data field contains the actual data, and has a length that corresponds to the amount of data. The type field identifies the type of data in the data field, and the length field identifies the actual length of the data field in bytes. The number N of data slots in the UDB 88 is not fixed, but can be varied in order to accommodate the number of data items that need to be transferred in a given situation. The data in the data field can optionally include multiple elements that each have the three-field type-length-data (TLD) format. In other words, a TLD block or data slot can be nested within the data field of another TLD block or data slot. A detailed explanation of UDBs is provided in U.S. Pat. No. 7,434,731, the entire disclosure of which is hereby incorporated herein by reference.

Figure 3:
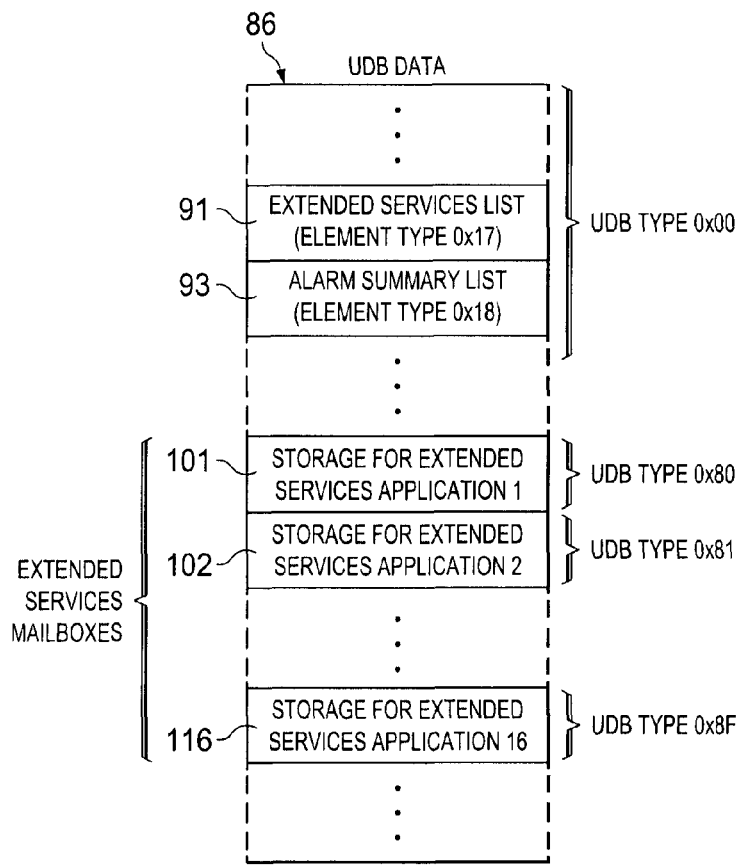
FIG. 3 is a diagrammatic view showing some data that is stored in a memory of the system of FIG. 1.

FIG. 3 is a diagrammatic view showing some of the UDB data stored at 86 in the memory 48 (FIG. 1). FIG. 3 does not show all of the data stored in the UDB data 86, but only selected items that are relevant to an understanding of aspects of the present disclosure. In this disclosure, when "0x" precedes a group of characters, it is an indication that the characters are in hexadecimal format. The UDB data 86 includes a group of data elements that are collectively referred to as UDB type 0x00. Two of the elements in this UDB type are an extended services list 91 and an alarm summary list 93. The extended services list 91 is a list of all the extended services 81 (FIG. 1) that are currently installed on the tag 11. The alarm summary list 93 is a list of all currently-active alarms that are associated with the extended services applications 81. For example, if the temperature detected by the temperature sensor 51 is currently in excess of a specified upper limit, then that constitutes an alarm condition that would be reflected in the alarm summary list 93. The extended services list 91 and the alarm summary list 93 are not part of the ISO 18000-7 standard, but instead are potential enhancements or extensions that could be added to the 18000-7 standard.

The UDB data 86 also includes sixteen UDB types 0x80 through 0x8F that are respective memory blocks or storage sections 101-116. The storage sections 101-116 are sometimes referred to herein as mailboxes. Each of the extended services 81 actually present on the tag 11 is assigned a respective one of the storage sections 101-116. In this regard, each of the extended services 81 on the tag is assigned a unique extended services identifier (ESID), which is a value from 0x80 to 0x8F. These ESIDs are uniquely defined for each tag, based on the set of extended services actually installed on that particular tag. Thus, for example, the GPS application 75 may have an ESID of 0x80 on one tag, an ESID of 0x83 on another tag, and an ESID of 0x8F on yet another tag. Although each of the extended services 81 is assigned only one mailbox in the disclosed embodiment, it would alternatively be possible for an extended service to be assigned two or more of the mailboxes.

The storage sections 101-116 are each used for transmission of information between a respective one of the extended services applications 81 and other parts of the overall system. For the sake of discussion, assume that the sensor application 72 (FIG. 1) has been assigned an ESID of 0x80 on the tag 11, where ESID 0x80 corresponds to the storage section 101 having UDB type 0x80. The sensor application 72 can place information in the storage section 101, such as the current status of the various sensors. That information can later be retrieved from the storage section 101, for example by the interrogator 12 in a manner described later. In addition, information intended for the sensor application 72 can be placed in the storage section 101, for example by the interrogator 12 in a manner described later. Later, that information can be retrieved from the storage section 101 by the sensor application 72. The storage sections 101-116 with UDB types 0x80 through 0x8F are not part of the ISO 18000-7 standard, but are potential enhancements or extensions that could be added to the 18000-7 standard.

The interrogator 12 (FIG. 1) can ask the tag 11 to send it any of the data that is stored within the UDB data 86. For example, the interrogator 12 can ask the tag 11 to send it the extended services list 91, so the interrogator will know exactly which extended services 81 are actually installed on the particular tag 11. The interrogator 12 can ask the tag 11 to send it the alarm summary list 93, so the interrogator will know whether any extended service 81 on that tag currently has an alarm condition that may require attention. Further, the interrogator 12 can ask the tag 11 to send it one or more of the storage sections 101-116, in order to provide the interrogator with more detail about one or more of the extended services applications on the tag.

The manner in which the interrogator 12 can communicate with the extended services 81 on the tag 11 will now be described in more detail. FIG. 4 is a diagrammatic view of a digital word 128 that is contained in the wireless signals 28 sent by the interrogator 12 to the tag 11. The general format of the digital word 128 conforms to the ISO 18000-7 communication protocol. The bits of the digital word 128 are incorporated into the wireless signals 28 by serially modulating the bits onto the 433.92 MHz carrier signal using FSK modulation. The bits of the word 128 are transmitted serially, from left to right in FIG. 4.

The digital word 128 includes several fields. The first field is a preamble 131, which is a pre-defined pattern of bits that will allow a device receiving the signal to recognize that a wireless signal 28 is beginning, and to synchronize itself to the wireless signal. In the disclosed embodiment, the preamble is approximately eight bits, but the specific number of bits can vary in dependence on factors such as characteristics of a particular receiver that is expected to receive the signal.

The next field 132 in the word 128 is a protocol identification (ID) 132. The protocol ID 32 identifies a communication protocol, such as a particular version of the 18000-7 protocol, so that a device receiving the word 128 will know what fields appear in the remainder of the word. The next field in the digital word 128 is a packet options field 133, which is a standard field that is not necessary to an understanding of the present invention, and is therefore not described here in detail. The next field is a packet length field 134, which is a numerical value representing the length in bytes of the entire digital word 128, excluding the preamble 131 and a postamble 141.

The next field is a tag manufacturer ID 135. The digital word 128 is used for point-to-point communications, where a particular interrogator transmits a message to a particular tag. A given tag can be uniquely identified by its manufacturer and its serial number. The tag manufacturer ID 135 is a code identifying the manufacturer of the particular tag to which the message containing the digital word 128 is directed.

The next field in the digital word 128 is a session ID 136. This is typically a code that uniquely identifies the interrogator 12 that transmitted the wireless signal 28 containing the digital word 128. The next field contains a tag serial number 137, which is the serial number of the specific tag to which the digital word 128 is directed.

The next field in the digital word 128 is a command operation code (opcode) 138. When the tag 11 receives a wireless signal 28 containing the digital word 128, the operation code 138 tells the tag what it should do in response to the signal. In the disclosed embodiment, the opcode 138 can be one of a number of different opcodes that are specified in the ISO 18000-7 standard. Alternatively, as discussed in more detail later, the opcode field 138 may contain a new and unique opcode that is not yet part of the ISO 18000-7 standard, but could be added to the standard as an enhancement or extension.

The command opcode 138 is followed by a command parameters field 139. The command parameters field 139 may or may not be present, depending on which opcode appears in the command opcode field 138. That is, some commands involve only an opcode and no parameters, and in that case the command parameters field 139 would not be present. However, most commands do require one or more parameters in addition to the opcode, and thus the command parameters field 139 will typically be present. However, the length and content of the command parameters field 139 will vary from opcode to opcode.

The next field in the digital word 128 is an error control field 140 containing a value that is a cyclic redundancy code (CRC). Communications between the interrogator 12 and the tag 11 often occur in environments that have relatively high noise levels. Therefore, it is desirable for a receiving device to be able to evaluate whether the word 128 that it received in a wireless signal 28 is correct, or has errors. Consequently the error control field 140 is included in the digital word 128 in order to permit the receiving device to identify and/or correct errors. Although the disclosed embodiment uses a CRC value, it would alternatively be possible to use any other suitable error detection and/or correction scheme, such as parity bits, or a forward error correction (FEC) code.

The next field in the digital word 128 is a postamble 141, or in other words a packet end field. This field signals to a receiving device that the transmission is ending. In the disclosed embodiment, the postamble 141 has eight bits that are all set to a binary zero. However, the postamble 141 could alternatively have some other suitable configuration. The command opcode field 138 and the command parameters field 139 together constitute a command 143. Some examples of different commands that could appear at 143 are discussed later.

As explained above, when the tag 11 receives the digital word 128, the command opcode 138 instructs the tag to take some type of action. Sometimes this action does not require the tag 11 to send any reply back to the interrogator 12. Typically, however, the tag 11 will need to send a reply to the interrogator 12. FIG. 5 is a diagrammatic view of a digital word 148 that is contained in wireless signals transmitted at 28 from the tag 11 to the interrogator 12 in response to receipt by the tag of a wireless signal 28 containing a digital word such as that shown at 128 in FIG. 4. The general format of the digital word 148 conforms to the ISO 18000-7 communication protocol. The digital word 148 includes several fields. The first two fields are a preamble 151 and a protocol ID 152. The preamble 151 is equivalent to the preamble 131 in digital word 128 (FIG. 4). The protocol ID 152 will normally be identical to the protocol ID 132 (FIG. 4) in the digital word 128 to which the received digital word 148 is a reply.

The next field is a tag status field 153. This field contains certain status information regarding the tag that is transmitting the digital word 148. For example, the tag status field 153 contains a bit that is set if the tag needs some type of service. This bit will be set if the battery 63 (FIG. 1) is low and needs to be replaced. The details of the tag status field 153 are known in the art, are not necessary to an understanding of the unique aspects of the present invention, and are therefore not discussed in further detail here.

The next field in the digital word 148 is a packet length 154, which is the total number of bytes in the digital word 148, excluding the preamble 151 and a postamble 161. The next four fields are a session ID 155, a tag manufacturer ID 156, a tag serial number 157, and a command opcode 158, which are respectively identical to the fields 136, 135, 137 and 138 in the previously-received digital word 128 to which the digital word 148 is a reply. The tag 11 may be simultaneously communicating with two or more interrogators, and the session ID 155 ensures that one interrogator accepts the digital word 148, while other interrogators recognize the digital word is not for them and discard it. The tag manufacturer ID 156 and tag serial number 157 uniquely identify the tag 11 that is transmitting the digital word 148. The interrogator 12 will typically be communicating simultaneously with a large number of tags, and the tag manufacturer ID 156 and tag serial number 157 will tell the interrogator exactly which tag sent the digital word 148. The command opcode 158 tells the interrogator 12 exactly which of its prior commands the tag is replying to by sending the digital word 148.

The next field in the digital word 148 is a response parameters field 159, the size and configuration of which will vary in dependence on the opcode that appears in field 158. The last two fields in the digital word 148 are an error control field 160 containing a CRC code, and a postamble 161. The fields 160 and 161 are functionally equivalent to the fields 140 and 141 in the digital word 128. The command opcode field 158 and the response parameters field 159 together constitute a response 163. Some examples of different responses that may appear at 163 are discussed later.

FIG. 6 is a diagrammatic view of a command 143A that is one example of a command that can appear at 143 in the digital word 128 of FIG. 4. The command 143A is an extended services command that includes a command opcode field 171 followed by a command parameters field 139A. The extended services command 143A does not exist under the current ISO 18000-7 protocol, but instead is a new and unique extension or enhancement that could be added to the 18000-7 protocol. In the disclosed embodiment, the command opcode 171 for this command is 0x27, which is an opcode that does not exist in the current ISO 18000-7 protocol. This command opcode 171 would appear in the command opcode field 138 of the digital word 128 in FIG. 4.

The command parameters 139A include a sequence ID 172, an extended services ID (ESID) 173, and a payload 174. The sequence ID 172 is used in situations where a single wireless transmission is not sufficient to deliver the entire payload to the tag. For example, the amount of information that needs to be sent in the payload field 174 may be larger than the maximum permissible size of the payload field, and the maximum permissible size of the payload field may vary as a function of local government regulations regarding wireless transmissions. Consequently, where necessary, the sequence ID 172 is used to identify a specific segment of a multiple-segment transmission, and also to indicate the number of segments yet to be transmitted. In more detail, if the information to be sent is large and is therefore split into N segments that will each be transmitted separately, the sequence ID 172 in the first transmission is set to N−1, the sequence ID in the next transmission is set to N−2, and so forth, until the sequence ID in the final transmission is set to zero (0). The tag 11 would collect and assemble all segments of the overall transmission before delivering anything to the designated extended services application. If the information to be sent is not large and can be sent in a single transmission without being split, then the sequence ID 172 for that first and only transmission is set to zero (0).

As discussed earlier, each of the extended services 81 (FIG. 1) in the tag 11 is assigned a unique ESID, which is one of the values from 0x80 to 0x8F. The ESID field 173 contains one of these ESIDs, and thus uniquely identifies a particular one of the extended services 81 on the tag 11 to which the command 143A relates. The payload 174 contains information that the main program 71 of the tag 11 extracts from the command 143A, and then places in the respective mailbox or storage section 101-116 assigned to the particular extended services program identified by the ESID field 173. The main program 71 then notifies the designated extended services application that this information is present in the mailbox. The main program 71 of the tag 11 merely stores the payload 174 in the mailbox of the designated extended services program, without any study or analysis of the content of the payload. Some examples of information that can be in the payload 174 are discussed later. Although in the disclosed embodiment the main program 71 merely stores the payload 174 in the mailbox of the designated extended services program, it would alternatively be possible for the main program 71 to bypass the mailbox, and instead deliver the payload directly to the extended services application.

FIG. 7 is a diagrammatic view of a response 163A that is an example of a response to the specific command 143A of FIG. 6, and that can appear as the response 163 in the digital word 148 of FIG. 5. The response 163A is an extended services reply, or in other words a reply to the extended services command shown in FIG. 6. The extended services reply 163A of FIG. 7 may or may not be sent to the interrogator, depending for example on which extended services application is identified by the extended services ID 173 in the command 143A of FIG. 6. The extended services reply 163A does not exist under the current ISO 18000-7 protocol, but instead is an extension or enhancement that could be added to the 18000-7 protocol.

The response 163A includes a command opcode field 181, a sequence ID field 182, and an ESID field 183, the contents of which are respectively identical to the command opcode 171, sequence ID 172 and ESID 173 in the command 143A to which the tag is responding. The payload 184 may be simply an acknowledgement by the tag 11 that the payload 174 of the received command 143A has been delivered to the mailbox of the extended services application identified by the ESID 173 in that received command. Alternatively, the payload 184 may be a reply from the particular extended services application identified by ESID 173 in the command 143A. Where the payload 184 is a reply from an extended services application, the tag 11 does not study or analyze the content of the payload 184. The tag 11 simply takes the payload 184 from the designated one of the extended services 81, or from the mailbox for that application, and forwards the payload 184 to the interrogator 12 without change. Where the payload 184 is a reply from an extended services application, the length of the payload 184 can vary, and is under control of the particular extended services application that generates the payload. Some examples of information that can be in the payload 184 are discussed later. In some cases, after an extended services application receives the command 143A, it may not be able to provide requested information for the payload 184 within a time limit imposed by the ISO 18000-7 standard. In that case, the extended services application can instead promptly provide for the payload 184 an interim reply indicating that its actual reply will be delayed. Then, the interrogator 12 can later issue another command 143A to actually retrieve the actual reply. In other situations, the information provided by the extended services application may be larger than the maximum permissible size of the payload 184. In that event, the information can be put into the mailbox assigned to that particular extended services application, and then the payload 184 can be used to notify the interrogator that the information is in the mailbox and is waiting to be retrieved in a manner discussed below.

FIG. 8 is a diagrammatic view of a different command 143B that may appear at 143 in the digital word 128. The command 143B is a read UDB command that is defined in the current ISO 18000-7 standard. The command 143B includes a command opcode 191 of 0x70, and command parameters 139B. The command parameters 139B include a UDB type code field 192. The value in field 192 identifies one of the various UDB types in the UDB data 86 (FIG. 3). For example, with reference to the left side of FIG. 3, the UDB type code at 192 in FIG. 8 may be 0x00, or one of 0x80 through 0x8F. The next field 193 in the command parameters 139B is an offset value representing an offset into the data corresponding to the UDB type code appearing at 192. Thus, for example, where the interrogator 12 wishes to read a large amount data from the UDB data 86, the interrogator can send multiple separate commands that request respective segments of the data, and each such command would have a respective different offset value at 193 in order to uniquely identify the start of each such data segment.

The last of the command parameters 139B is a maximum packet length value 194. When a tag eventually replies to the command 143B, the field 194 specifies the maximum permissible length of a packet returned by the tag. In other words, the field 194 specifies the maximum value that can appear in the packet length field 154 of the digital word 148 (FIG. 5). The tag can elect to use a packet length less than the maximum length specified in field 194, but the tag is not permitted to use a larger packet length. Over time, the interrogator may elect to adjust the maximum packet length value that it puts in the field 194 of transmitted messages, based on factors such as ambient operating conditions. For example, if the interrogator 12 and tag 11 are currently operating in a noisy environment, the interrogator may elect to reduce the maximum packet length value presented in the field 194 of transmitted messages. Later, if the environment becomes less noisy, the interrogator may elect to increase the maximum packet length value presented in the field 194 of transmitted messages.

FIG. 9 is a diagrammatic view of a response 163B that is transmitted by the tag 11 in response to the command 143B of FIG. 8, and that can appear as the response 163 in the digital word 148 of FIG. 5. The response 163B has a format that is defined in the current ISO 18000-7 standard. The response 163B includes a command opcode 201 followed by a response parameters field 159B, where the response parameters field includes a UDB type code field 202, a UDB type total length field 203, a requested offset field 204, and a UDB data field 205.

The fields 201, 202, and 204 are identical to the fields 191, 192 and 193 in the particular command 143B to which the tag is responding. The field 203 identifies the total amount of data (in bytes) that the particular tag currently has stored in the UDB data 86 (FIG. 3) for the specified UDB type. Thus, for example, if the UDB type is specified to be 0x80, the field 203 will identify the total number of bytes of data that are currently stored in the storage section 101 of the UDB data 86. This tells the interrogator 12 how much data of the specified UDB type is currently stored in the tag, so the interrogator 12 knows how much data is available to be retrieved. The UDB data field 205 contains an actual segment of data from the UDB data 86, presented in TLD format.

FIG. 10 is a diagrammatic view of one specific example of UDB data 205A that can appear in the field 205 of the response 163B in FIG. 9. The UDB data 205A includes a UDB element type field 211. This field is used to distinguish different element types within a given UDB type. For example, with reference to FIG. 3, UDB type 0x00 encompasses several different types of data, including the extended services list 91 and the alarm summary list 93. The extended services list 91 is identified as UDB element type 0x17, whereas the alarm summary list 93 is identified as UDB element type 0x18. These two UDB element types do not exist under the current ISO 18000-7 protocol, but instead represent an extension or enhancement that could be added to the 18000-7 protocol. In FIG. 10, the UDB element type field 211 contains the value 0x17 to indicate that the UDB data 205A contains the extended services list 91 from FIG. 3.

The next field in the UDB data 205A is a length field 212, which contains a numerical value identifying the length in bytes of the data that follows the length field 212. In FIG. 10, the data includes several items 213 through 215 that each identify a respective one of the extended services 81 (FIG. 1) actually installed on the tag 11. Only extended services that are actually installed on the tag are listed. If no extended services are currently installed on the tag, then none of the items 213-215 will be present, and the length field 212 will contain a zero. The items 213-215 all have the same format, and the item 213 is expanded to show this format.

More specifically, the item 213 includes a description type field 231, a length field 232, an ESID field 233, and a data field 234. In the disclosed embodiment, the description type field 231 contains either a value 0x00 or a value 0x01, to specify the format for the data field 234. In particular, if the description type field 231 contains the value 0x00, then the data field 234 uniquely identifies the particular extended services application by setting forth a previously-assigned numerical value unique to that application. Alternatively, if the description type field 231 contains the value 0x01, then the data field 234 contains a string of ASCII characters uniquely identifying the particular type of extended services application.

The length field 232 gives the length in bytes of the fields 233 and 234, and the ESID field 233 contains the ESID value assigned by the tag to the particular extended services application to which item 213 corresponds. The interrogator 12 can use the ESID value in field 233 to uniquely identify the particular extended services application in subsequent communications, and will know from the data field 234 exactly what type of extended services application it is working with.

Figure 11:
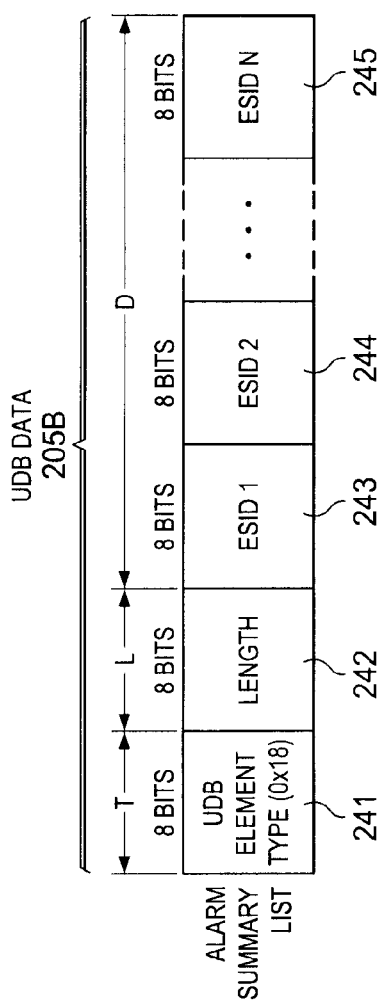
FIG. 11 is a diagrammatic view of another example of UDB data that can appear in the response of FIG. 9.

FIG. 11 is a diagrammatic view of a different example of UDB data 205B that could appear at 205 in the response 163B of FIG. 9. The UDB data 205B includes a UDB element type field 241, a length field 242, and some ESID fields 243-245. The UDB element type field 241 contains a value 0x18, to indicate that the data in the UDB data 205B is the alarm summary list 93 (FIG. 3) from the UDB data 86. The length field 242 contains a numerical value representing the length in bytes of all the ESID fields 243-245. The fields 243-245 do not necessarily identify all extended services applications 81 that are currently installed on the tag 11. Instead, the fields 243-245 identify only those extended services applications 81 that currently have an active alarm of some type. If no extended services application currently has an active alarm, then none of the fields 243-245 will be present, and the length field 242 will contain a value of zero.

Figure 12:
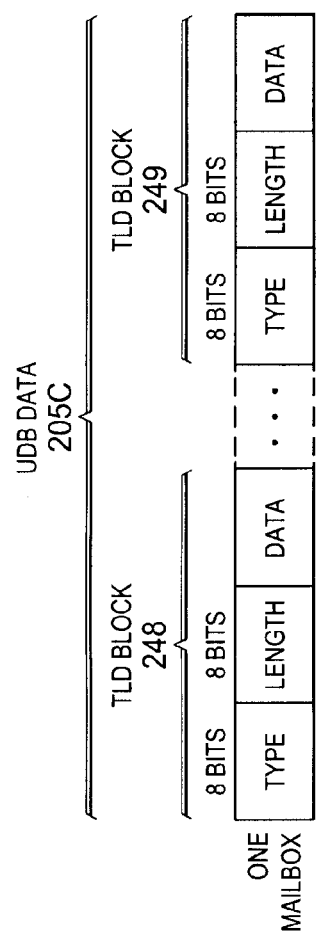
FIG. 12 is a diagrammatic view of yet another example of UDB data that can appear in the response of FIG. 9.

FIG. 12 is a diagrammatic view of still another example of UDB data 205C that could appear at 205 in the response 163B of FIG. 9. As discussed above, the command 143B of FIG. 8 can specify a particular UDB type code in field 192, and this can be one of the type codes 0x80 through 0x8F that correspond to the storage sections or mailboxes 101-116 in the UDB data 86 (FIG. 3). In FIG. 12, the UDB data 205C includes several TLD blocks 248-249, each of which includes a type field, a length field and a data field. The data fields of these TLD blocks contain some or all of the data from the specified storage section or mailbox 101-116. Although FIG. 12 shows a series of TLD blocks, the UDB data 205C could include only a single TLD block, if the corresponding storage section contained only a single data element. Further, if the corresponding storage section did not happen to contain any data, the UDB data 205C would no TLD blocks, and would have a length of zero.

As explained earlier, the interrogator 12 and any of the extended services 81 can directly exchange information with each other, where information from the interrogator 12 is placed in the payload 174 of the extended services command 143A shown in FIG. 6, and information from the particular extended service is either placed in the payload 184 of the extended services response 163A shown in FIG. 7, or placed in the UDB data field 205 of the read UDB reply 163B shown in FIG. 9. This technique can be referred to as "tunneling" information through the ISO 18000-7 wireless signals 28 and the main program 71 of the tag 11. For simplicity and clarity, a discussion will first be provided of certain exchanges that can occur between the interrogator 12 and the sensor application 72 (FIG. 1) that manages the three sensors 51-53. As one aspect of this, the interrogator 12 and the sensor application 72 can exchange information in a manner conforming to an industry-standard protocol commonly known as ISO 21451.7, which is based on another industry-standard protocol commonly know as IEEE 1451.7. As used herein, the term ISO 21451.7 refers to a specific version of that standard, which is ISO/IEC/IEEE WD 21451.7, 2009-07-13. And as used herein, the term IEEE 1451.7 refers to a specific version of that standard, which is IEEE P1451.7/D1.0, October 2008. The interrogator 12 and sensor application 72 can also carry out information exchanges in a manner that is not currently part of either the ISO 21451.7 standard or the IEEE 1451.7 standard, but that involves new and unique enhancements or extensions that could be added to these standards.

Figure 13:
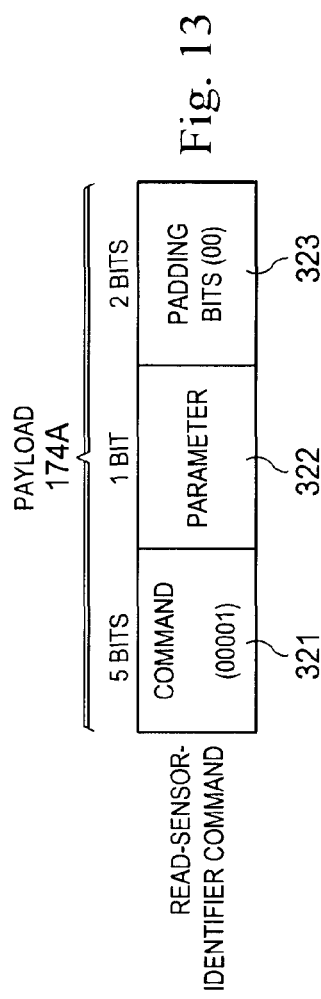
FIG. 13 is a diagrammatic view of an example of a payload that contains a command, and that could appear in the command of FIG. 6.

FIG. 13 is a diagrammatic view of one example of a payload 174A that could appear as the payload 174 in the extended services command 143A of FIG. 6. The payload 174A is a new read-sensor-identifier command that does not exist under the current ISO 21451.7 protocol, but instead is an extension or enhancement that could be added to the 21451.7 protocol. In this regard, ISO 21451.7 and IEEE 1451.7 ach include a read-sensor-identifier command, but it can only read information regarding a single sensor. In contrast, the new read-sensor-identifier command in payload 174A will cause the sensor application 72 to return a single reply that identifies all sensors associated with the tag 11.

The command in payload 174A includes a 5-bit command field 321, a 1-bit parameter field 322, and a 2-bit field 323 containing padding bits. The command field 321 contains a unique code identifying the read-sensor-identifier command. The parameter field 322 contains a single bit that identifies a format the sensor application 72 should use in its reply to identify each sensor. In particular, if the bit in the parameter field 322 is a binary "0", then the sensor application 72 will identify each sensor with the serial number of the sensor, and a unique sensor ID code that is sometimes referred to as a port address. On the other hand, if the bit in the parameter field 322 is a binary "1", then the sensor application 72 will identify each sensor by providing the unique sensor ID code for the sensor, and fields 1-3 from a transducer electronic data sheet (TEDS) for that particular sensor.

In this regard, and as is known in the art, a TEDS for a given sensor is essentially a table having a series of pre-defined fields that each provide information about a respective characteristic of the sensor. Under the TEDS standard, field 1 is a 3-bit field that normally contains the binary value "001". Field 2 is a 7-bit field containing a value that identifies the particular type of sensor, such as whether the sensor is a temperature sensor, a shock sensor, a humidity sensor, and so forth. Field 3 is a 5-bit field used only for certain types of sensors, in particular to identify a specific sub-type of the general sensor type identified in field 2. For example, if field 2 indicates that the sensor is a chemical sensor, field 3 will identify the particular type of chemical sensor.

Turning to the padding bit field 323, the ISO 21451.7 and IEEE 1451.7 protocols are bit-based protocols, whereas the ISO 18000-7 protocol is a byte-based protocol. In FIG. 13, the 5-bit command field 321 and the 1-bit parameter field 322 total up to six bits, which is less than a byte. The 2-bit field 323 of padding bits is therefore provided to ensure that the payload 174A has an overall size of one byte. The field 323 contains a binary value of "00". The bits in the field 323 have no substantive meaning, and are discarded by the sensor application 72 after it receives the payload 174A sent by the interrogator.

Figure 14:
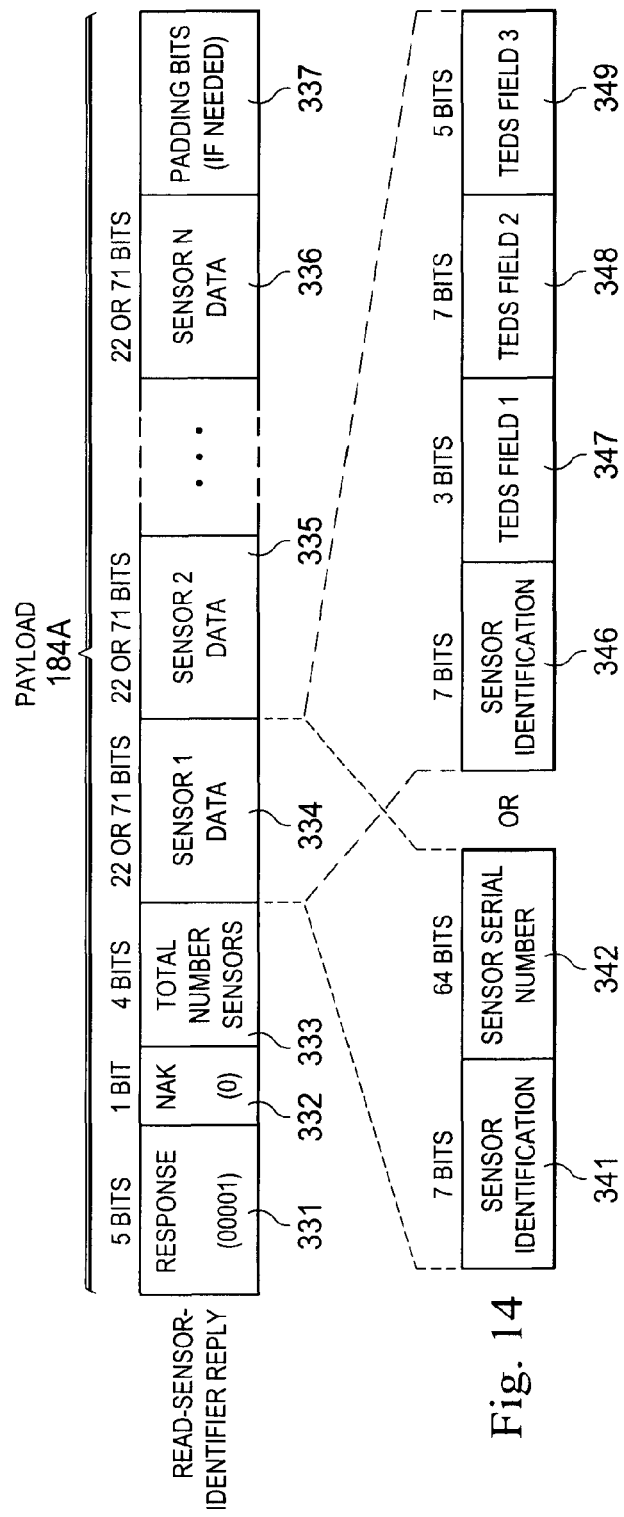
FIG. 14 is a diagrammatic view of an example of a payload that contains a reply to the command of FIG. 13, and that could appear in the response of FIG. 7.

FIG. 14 is a diagrammatic view of a payload 184A that can appear as the payload 184 of the extended services response 163A shown in FIG. 7. After the sensor application 72 receives the command 321 in the payload 174A, it prepares the payload 184A of FIG. 14 and returns it to the interrogator 12 as a read-sensor-identifier reply. The read-sensor-identifier reply in the payload 184A of FIG. 14 does not exist under either the current ISO 21451.7 protocol or the current IEEE 1451.7 protocol, but instead is an extension or enhancement that could be added to these protocols.

In more detail, the payload 184A includes several fields 331 through 337. Field 331 is a 5-bit response field containing identically the same code that appeared in the command field 321 of the payload 174A. The next field is a 1-bit NAK field. This field contains a binary "0" to indicate that the sensor application 72 did not encounter any error in executing the command specified at 321 in the payload 174A. If an error had occurred, then the NAK field would contain a binary "1", but in that case the remainder of the payload would have a different format, as discussed in more detail later.

The next field 333 of the payload 184A is a 4-bit numerical value specifying the total number of sensors associated with the tag 11. The field 333 is followed by several fields 334 through 336 that each provide identifying information for a respective one of the sensors in the tag. The number of fields 334-336 will be equal to the numerical value appearing in field 333. If the tag has no sensors, then field 333 will contain a value of zero, and none of the fields 334-336 will be present. When present, the fields 334-336 each have a length of either 22 bits or 71 bits, as discussed in more detail below. The last field 337 in the payload 184A is only present if needed, and contains padding bits to the extent needed to ensure that the overall length of the payload 184A is an integer number of bytes.

As discussed above, the fields 334 through 336 that identify respective sensors can each have one of two different formats, and these two alternative formats are each shown in the lower portion of FIG. 14. In particular, if the parameter bit 322 in the payload 174A of FIG. 13 is a binary "0", then each of the fields 334 through 336 will contain two fields 341 and 342. Field 341 is a 7-bit field containing the unique sensor ID or port address discussed above, and field 342 is a 64-bit field containing a numerical value that is the serial number of the particular sensor. Fields 341 and 342 together contain a total of 71 bits. On the other hand, if the parameter bit 322 in the payload 174A of FIG. 13 is a binary "1", then the fields 334-336 will each contain four fields 346 through 349. Field 346 is a 7-bit field containing the same sensor ID that would appear in field 341, and fields 347 through 349 are respectively a 3-bit field, a 7-bit field, and a 5-bit field that respectively contain TEDS fields 1 through 3. Fields 346 through 349 together contain a total of 22 bits.

Figure 15:
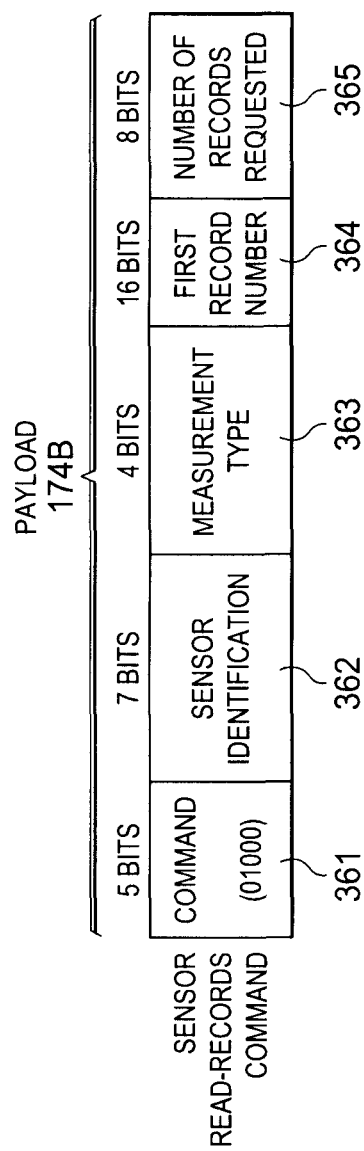
FIG. 15 is a diagrammatic view of another example of a payload that contains a command, and that could appear in the command of FIG. 6.

FIG. 15 is a diagrammatic view of a payload 174B that is an alternative example of a payload that could appear as the payload 174 of the extended services command 143A in FIG. 6. Payload 174B contains a sensor-read-records command that does not exist under either the current ISO 21451.7 protocol or the current IEEE 1451.7 protocol, but instead is an extension or enhancement that could be added to these protocols. The payload 174B includes five fields 361 through 365. The first field 361 is a 5-bit command field containing a unique code that identifies the sensor-read-records command. The next field 362 is a 7-bit field containing the unique sensor ID or port address of a particular sensor for which information is being requested. The interrogator will have previously obtained this unique sensor ID for each of the sensors, by using the read-sensor-identifier command of FIG. 13, in response to which it receives the IDs back in the fields 341 or 346 of the response shown in FIG. 14.

The next field in the payload 174B is a 4-bit measurement type field 363 that identifies the particular type of measurement information being requested. The permissible measurement type codes are identified in ISO 21451.7, and are therefore not all described in detail here. But by way of example, the interrogator could use the measurement type field 363 to request (1) an average of the readings from the specified sensor, (2) the most recent reading from the specified sensor, (3) part or all of a log of a series of readings from the specified sensor, either with or without date and time information for each reading, or (4) other types of measurement information.

This information is all maintained by the sensor application 72 of FIG. 1 in the sensor data 77.

The next field 364 is 16-bit field containing a numerical value specifying the number of the first record to be returned from the data maintained for the measurement type specified at 363. The next field 365 is an 8-bit field containing a numerical value specifying the number of records being requested. The interrogator might, for example, send a first sensor-read-records command in which the field 364 specifies record 1 and the field 365 requests 10 records. The sensor application 72 would then send back ten records. The interrogator 12 might then send a second sensor-read-records command in which the field 364 specifies record 11, and the field 365 specifies 10 records. The sensor application 72 would then return records 11 through 20.

Figure 16:
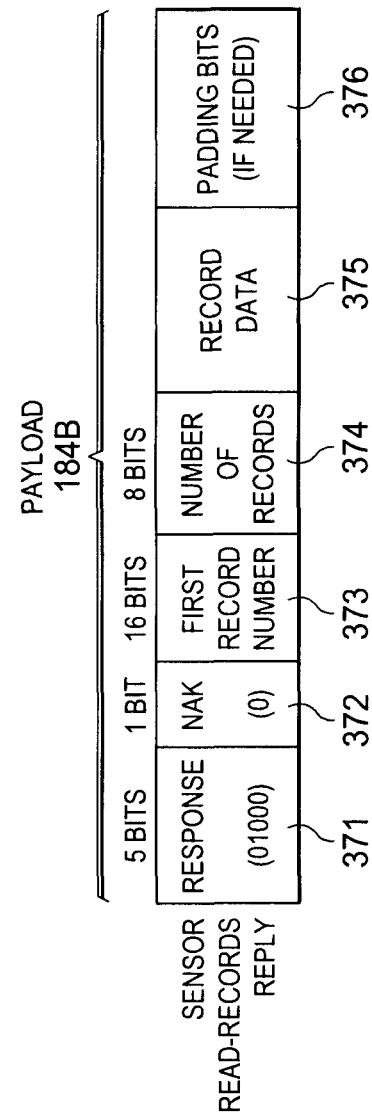
FIG. 16 is a diagrammatic view of an example of a payload that contains a reply to the command of FIG. 15, and that could appear in the response of FIG. 7.

FIG. 16 is a diagrammatic view of a payload 184B that could appear as the payload 184 in the extended services response 163A of FIG. 7. The payload 184B contains a sensor-read-records reply, which the sensor application 72 returns in response to receipt of a sensor-read-records command 174B (FIG. 15). The sensor-read-records reply in the payload 184B of FIG. 16 does not exist under either the current ISO 21451.7 protocol or the current IEEE 1451.7 protocol, but instead is an extension or enhancement that could be added to these protocols.

The payload 184B includes six fields 371-376. The fields 371, 373 and 374 will respectively be identical to the fields 361, 364 and 365 in a sensor-read-records command received from the interrogator in the payload 174B (FIG. 15). The field 372 is a 1-bit NAK field that will contain a binary "0" to indicate no error occurred. The field 375 will contain the requested data. The field 376 is a padding bits field, and will only be present where needed to ensure that the overall length of the payload 184B is an integer number of bytes.

FIG. 17 is a diagrammatic view of a payload 174C that is an example of still another payload that could appear at 174 in the extended services command 143A of FIG. 6. The payload 174C contains a read-all-sensor-status command, which is a request for the sensor application 72 to return status information regarding each sensor associated with the tag 11. The read-all-sensor-status command of FIG. 17 does not exist under the current ISO 21451.7 protocol, but instead is an extension or enhancement that could be added to the 21451.7 protocol. This command has two fields 401 and 402. The field 401 is a 5-bit field containing a unique code that identifies this particular command. The field 402 is a 3-bit field of padding bits that contains a binary value of "000", in order to give the payload 174C an overall length of one byte.

FIG. 18 is a diagrammatic view of a payload 184C that is a further example of a payload that could appear at 184 in the extended services response 163A of FIG. 7. The payload 184C is a read-all-sensor-status reply issued by the sensor application 72 after it receives the read-all-sensor-status command shown in FIG. 17. The read-all-sensor-status reply of FIG. 18 does not exist under either the current ISO 21451.7 protocol or the current IEEE 1451.7 protocol, but instead is an extension or enhancement that could be added to these protocols.

The payload 184C includes several fields 411 through 417. The field 411 is a 5-bit response field containing identically the same numerical code as the field 401 in the command of FIG. 17. The next field 412 is a 1-bit NAK field containing a binary "0" to indicate that the sensor application 72 did not encounter any error in executing the command of FIG. 17. The next field 413 is a 4-bit field containing a numerical value identifying the total number of sensors associated with the tag 11. The field 413 is followed by some fields 414 through 416 that are each a 32-bit field containing status information for a respective one of the sensors associated with the tag. The number of fields 414 through 416 is equal to the numerical value appearing in the field 413. If the tag has no sensors, then the field 413 will contain a value of zero, and none of the fields 414 through 416 will be present. The last field 417 contains six padding bits that are each a binary "0", to ensure that the overall length of the payload 184C is an integer number of bytes.

Each of the fields 414 through 416 contains seven fields that are shown at 421 through 427. The field 421 is a 7-bit field containing the unique sensor ID or port address that was discussed earlier. The next field 422 is a 1-bit enabled status field that indicates whether the specified sensor is currently enabled or disabled. In this regard, the interrogator 12 can send the sensor application 72 a command that identifies a particular sensor and indicates the sensor is to be enabled or disabled. The enabled status bit 422 indicates whether the sensor is currently enabled or disabled.

The next field 423 is a 4-bit field reserved for future use. This is followed by a 12-bit sensor type field 424, which contains fields 1 through 3 of the TEDS for the specified sensor. The next field 425 is a 2-bit field reserved for future use. The next field 426 is a 2-bit alarms set field. One bit indicates whether or not monitoring is currently enabled for a lower threshold associated with the specified sensor, and the other bit indicates whether or not monitoring is currently enabled for an upper threshold associated with that sensor.

The next field 427 is 4-bit alarms triggered field. One bit indicates whether or not an alarm has been triggered for the upper threshold. The next bit indicates whether an alarm has been triggered for the lower threshold. The next bit indicates whether, for any of the data logs maintained for that sensor, a memory full condition has been reached, and memory roll-over has not been asserted (or is not possible to assert). The remaining bit indicates whether the specified sensor has flagged a low battery condition, based on criteria specified by the sensor manufacturer. Where a tag has multiple sensors supported by a single battery, such as the battery 63 of FIG. 1, a low battery condition can cause multiple sensors to report a low battery status condition.

FIG. 19 is a diagrammatic view of a payload 184D that is yet another example of a payload that can appear at 184 in the extended services response 163A of FIG. 7. The payload 184D contains an error reply that does not exist under either the current ISO 21451.7 protocol or the current IEEE 1451.7 protocol, but instead is an extension or enhancement that could be added to these protocols. More specifically, and as discussed earlier, the sensor application 72 may encounter some type of error in attempting to execute and respond to a command received from the interrogator 12. For example, the interrogator may ask the sensor application 72 to return a specified number of data records of a data type for which the sensor application 72 currently has a smaller number of records. The sensor application 72 therefore needs to notify the interrogator 12 that an error has occurred. The payload 184D of FIG. 19 represents an error reply that the sensor application 72 can send to the interrogator 12 to identify an error.

The payload 184D includes five fields 451 through 455. The field 451 is a 5-bit response field that contains identically the same value as the first field of the particular command that triggered the error. In other words, the field 451 would contain the value from one of the field 321 (FIG. 13), the field 361 (FIG. 15), the field 401 (FIG. 17), or the command field in some other command that is not discussed here. The next field 452 is a 1-bit NAK field that contains a binary "1" to indicate an error has occurred. Assume for the sake of discussion that the sensor application 72 received the sensor-read-records command of FIG. 15. The interrogator 12 would receive back a response beginning with a 5-bit field containing the code from field 361 of the command, followed by the 1-bit NAK field. The interrogator would look at the first five bits of the response to identify the corresponding command, and would then look at the 1-bit NAK field to determine whether or not an error occurred. If the NAK bit is a binary "0", then the interrogator knows that no error occurred, and that the NAK field will be followed by the four fields 371-376 shown in FIG. 16. In contrast, if the 1-bit NAK field is a binary "1", then the interrogator knows that an error occurred, and that the remainder of the message will be the three fields 453-455 shown in FIG. 19.

In FIG. 19, the NAK field 452 is followed by a 6-bit error code field 453. This field contains a code or a numerical value that uniquely identifies the particular error encountered by the sensor application 72. The error code field 453 is followed by an optional data field 454. The data field 454 may or may not be present, depending on the error code in field 453. That is, some error codes may be accompanied by related data that appears in the field 454, while other error codes may have no need to return related data. As to errors that do return data in the field 454, the size of the data field may vary from one type of error to another. The last field 455 is a padding bits field that may or may not be present. It will be included where necessary to ensure that the overall length of the payload 184D is an integer number of bytes.

The foregoing discussion has given several specific examples of how the interrogator 12 and sensor application 72 can communicate with each other using the payload 174 (FIG. 6) and the payload 184 (FIG. 7). The payloads 174 and 184 can also be used to effect communication between the interrogator 12 and any of the other extended services applications 81 (FIG. 1) that are present in the tag 11. The commands and replies discussed in association with FIGS. 13 through 19 are specific to the sensor application 72, and include some extensions or enhancements to the ISO 21451.7 and IEEE 1451.7 standards, which relate specifically to sensors.

As to communications between the interrogator 12 and other extended services applications 81, the manufacturer or author of each extended services application 81, such as those shown at 73 to 75 in FIG. 1, would define formats for commands and replies that are customized to suit the particular function and operation of that extended services application. It is not necessary to describe here in detail a separate command and reply structure for each of the extended services applications 73-75 in FIG. 1. As discussed earlier, the extended services applications 81 in FIG. 1 are merely exemplary, and there are a variety of other extended services applications that could be implemented on the tag 11.

Although a selected embodiment has been illustrated and described in detail, it should be understood that a variety of substitutions and alterations are possible without departing from the spirit and scope of the present invention, as defined by the claims that follow.

What is claimed is:

1. A radio frequency identification tag apparatus comprising a main section providing basic radio frequency identification functionality, the main section having an extended services interface, the extended services interface receiving wireless signals containing a message type which includes an extended services segment and which is an extension to an industry-standard communication protocol, said main section responding to receipt of a wireless signal containing a message conforming to said message type by transmitting said extended services segment thereof through said extended services interface, wherein said extended services segment is an extension to an industry-standard further communication protocol that is different from said communication protocol for said wireless signals.

2. An apparatus according to claim 1, wherein said communication protocol is the ISO 18000-7 communication protocol.

3. An apparatus according to claim 2, wherein said tag includes a further section that includes a sensor and that receives said extended services segment from said main section through said extended services interface, said further communication protocol being one of the IEEE 1451.7 communication protocol and the ISO 21451.7 communication protocol.

4. An apparatus according to claim 1, including a further section that provides extended services functionality different from said basic functionality, and that receives said extended services segment from said main section through said extended services interface.

5. An apparatus according to claim 4, wherein said further section is part of said tag.

6. An apparatus according to claim 4, wherein said further section is physically separate from said tag.

7. An apparatus according to claim 4, wherein said extended services functionality includes provision of security for said tag.

8. An apparatus according to claim 4, wherein said further section includes one of a sensor, a receiver circuit that receives wireless satellite signals containing positioning information, and a real time locating circuit.

9. An apparatus according to claim 4, wherein said further section includes a plurality of sensors, and a single instantiation of an application that interfaces each of said sensors to said extended services interface, and that is compatible with and also implements an extension to one of IEEE 1451.7 and ISO 21451.7.

10. An apparatus according to claim 1, wherein said main section responds to receipt through said extended services interface of a further segment by transmitting a further wireless signal that conforms to said communications protocol and that contains said further segment.

11. A radio frequency identification tag, comprising:
   a transceiver operable to wirelessly interface via wireless signals with a corresponding transceiver of an interrogator over an industry-standard communications protocol, the industry-standard communications protocol comprising an extension having an extended services segment;
   a processor comprising a main program operable to interface with a plurality of extended services application modules via information of said extended services segment, each of said extended services application modules providing one or more processing capabilities for a sensor corresponding thereto, each said sensor operable to perform any one of: receiving a sensory stimulus from an environment external to the radio frequency identification tag and transmitting a corresponding signal thereto to the processor; and receiving a signal from the processor and transmitting a corresponding sensory stimulus thereto to the external environment, wherein said extended services segment is an extension to an industry-standard further communication protocol that is different from said communication protocol for said wireless signals.

12. A radio frequency identification tag, comprising:
- a transceiver operable to wirelessly interface with a corresponding transceiver of an interrogator over an industry-standard communications protocol, the industry-standard communications protocol comprising an extension comprising an extended services segment;
- a processor operable to interface with the transceiver;
- a main program operable to execute in relation to one or more instructions from the processor;
- a plurality of sensors each operable to perform any one of: receive a sensory stimulus from an environment external to the radio frequency identification tag and transmit a corresponding signal thereto to the processor; and receive a signal from the processor and transmit a corresponding sensory stimulus thereto to the external environment; and
- a plurality of extended services application modules operable to interface with the main program via one or more data of said extended services segment, each of said extended services application modules providing one or more processing capabilities for a said sensor corresponding thereto.

13. An apparatus according to claim 12, wherein the industry-standard communications protocol is the ISO 18000-7 communication protocol.

* * * * *